June 7, 1949.  W. PILKINGTON  2,472,679
SUPPORT FOR DRILLS

Filed March 7, 1946  2 Sheets-Sheet 1

INVENTOR.
William Pilkington
BY Lancaster, Allwine & Rommel
ATTORNEYS.

June 7, 1949.　　　W. PILKINGTON　　　2,472,679
SUPPORT FOR DRILLS

Filed March 7, 1946　　　　　　　2 Sheets-Sheet 2

INVENTOR.
William Pilkington
BY *Lancaster, Allwine & Rommel*
ATTORNEYS.

Patented June 7, 1949

2,472,679

UNITED STATES PATENT OFFICE 2,472,679

SUPPORT FOR DRILLS

William Pilkington, Beckley, W. Va.

Application March 7, 1946, Serial No. 652,572

1 Claim. (Cl. 77—54)

This invention relates to a support for drills and it is one object of the invention to provide a support which is particularly adapted for use in general machine shops and includes a carriage provided with wheels and carrying a support or standard to which is applied a drill supporting clamp adjustable vertically upon the support so that holes may be drilled in a wall or beam at desired heights.

Another object of the invention is to provide a support or standard so mounted upon a carriage that it may be turned about a fastener connecting it with the carriage and holes thus formed diagonally in the element being drilled.

Another object of the invention is to provide a clamp so formed that a stud or bar extending rearwardly from a drill will have adjustable engagement with the clamp in order to apply pressure to the rear of the drill and to advance the drill point as a hole is formed.

Another object of the invention is to provide a carriage having threaded shafts passing vertically through it for engagement with the ground and thus allow the carriage to be raised and its weight supported upon the shafts or screws instead of upon its wheels which would be liable to turn when subjected to vibration or pressure during drilling operations.

Another object of the invention is to provide the carriage with a support mounted back of the forward standard and thus allow metal plates to be supported in vertical position upon the carriage and the forward standard turned about its fastener so that the drill will be directed rearwardly in position for forming holes in plates and the like.

Another object of the invention is to provide a truck or carriage having a strong platform upon which weights may be placed and thus add to the weight of the carriage and prevent it from being jolted out of its proper position during a drilling operation.

The invention is illustrated in the accompanying drawings wherein.

Figure 3:
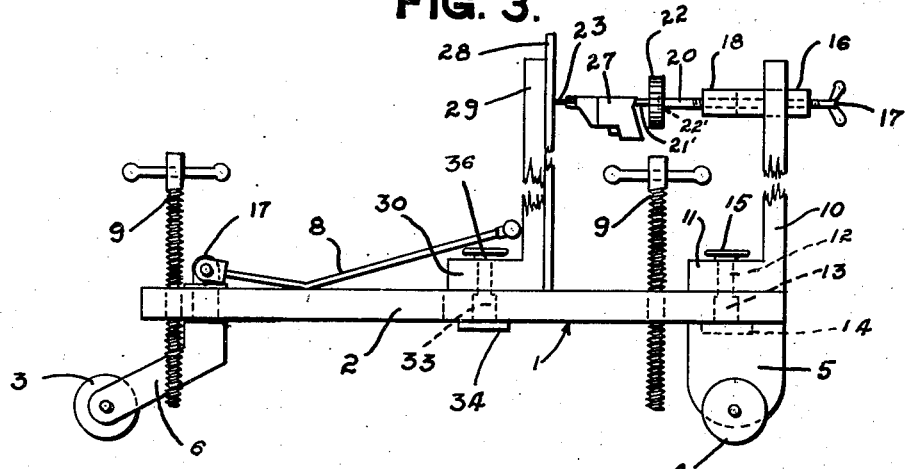
Figure 3 is a side view showing the improved drill support with its weight supported upon its wheels and a plate resting upon the carriage of the support in position to be drilled.
Figure 4:
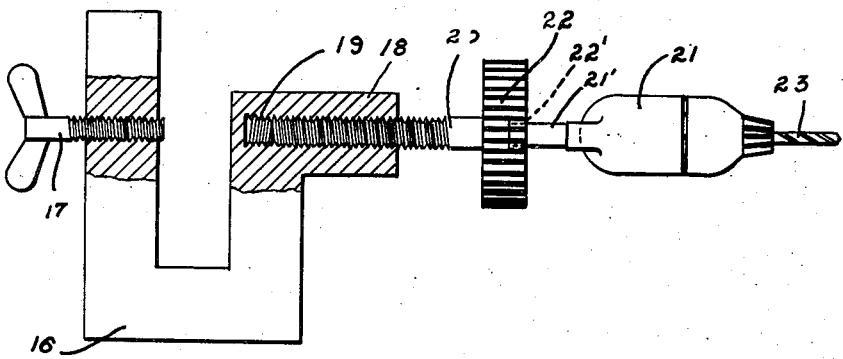
Figure 4 is a view upon an enlarged scale showing the drill and the drill-holding clamp partially in section and partially in top plan.
Figure 1:
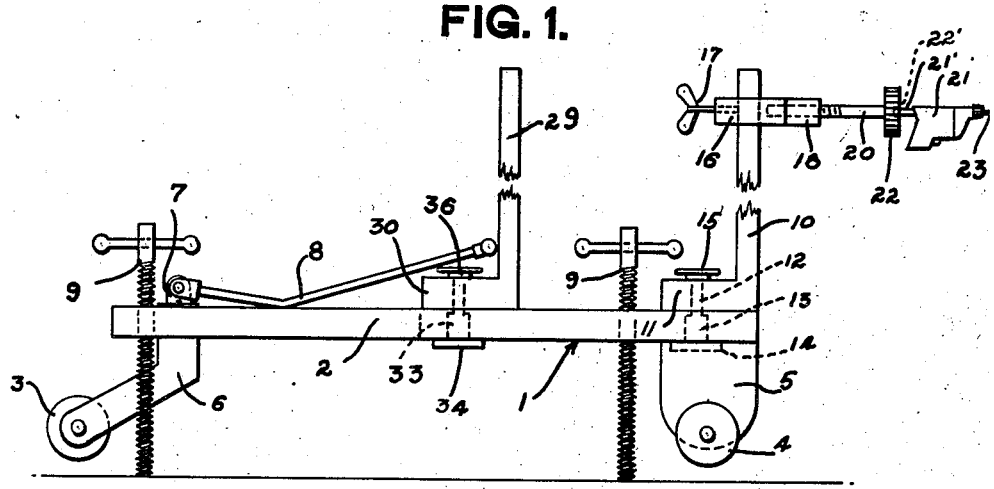
Figure 1 is a side elevation of the improved drill support with its weight supported upon the shafts or screws instead of upon its wheels.
Figure 2:
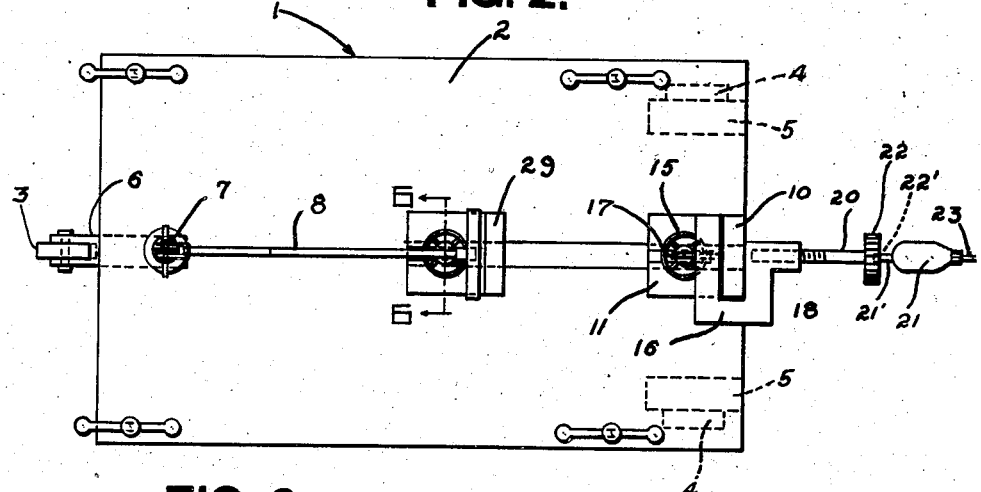
Figure 2 is a top plan view thereof.
Figure 6:
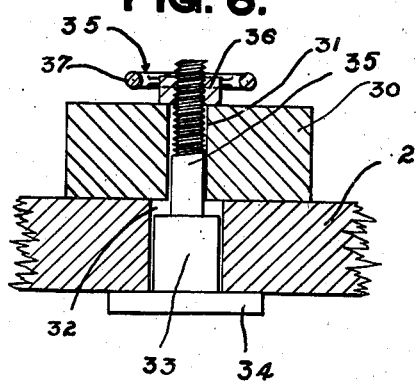
Figure 6 is a sectional view upon an enlarged scale taken along the line 6—6 of Figure 2.

This improved drill support is particularly adapted for use in machine shops, mines, etc. and so constructed that a drill may be held in position for forming a hole at desired heights in a wall or brest of a mine, structural beams, and the like. The carriage which is indicated in general by the numeral 1 has a platform 2 which may be formed of wood or metal and is of such thickness that it may support a heavy weight without bending or being otherwise damaged. Therefore, scrap iron, rock, or the like may be piled upon the carriage to impart weight to it and prevent vibrations or pressure from shifting the carriage out of a desired position. Front and rear wheels 3 and 4 are provided for the carriage, the rear wheels 4 being rotatably mounted at sides of blocks 5 extending downwardly from rear corners of the platform and the front wheel 3 being rotatably carried by a fork or castor 6 having a shank 7 journaled through the platform and carrying a handle 8 which is pivotally mounted so that it may be swung vertically to a convenient position for use or be set at rest upon the platform as shown in Figures 1, 2, and 3. Threaded shafts or jack screws 9 pass vertically through the platform at opposite sides of its front and rear end portions and are of such length that by turning them in a lowering direction their lower ends may be brought into contact with the ground and the platform shifted upwardly to move the wheels out of contact with the ground and cause the carriage to be supported upon the screws during a drilling operation.

A standard 10 of suitable height extends vertically at the rear end of the carriage and at its lower end is formed with a base 11 having an opening therein to receive the reduced and threaded upper portion 12 of a bolt 13 which is passed upwardly through the platform and has a head 14 at its lower end. A fastener 15 consisting of a threaded hub carrying a hand wheel is screwed upon the upper end of the threaded shank 12 of the bolt and when this fastener is tightened the standard will be firmly secured upon the platform in set position. Since the standard is secured by a bolt it may be easily removed and thus allow the truck to be pulled through a low passage. The standard carries a clamp 16 which is substantially U-shaped and straddles the standard and has one arm formed with a threaded opening to receive a set screw 17 by means of which the clamp or bracket 16 is firmly secured upon the standard at a desired height. The other arm of the bracket is formed with a side extension or lug 18 through which a threaded socket 19 is formed to receive a threaded shaft 20 carrying a knurled wheel or disc 22 having a recess or depression 22' in the outer face thereof. The drill 21 may be a compressed air or electrically driven drill of conventional design, to the rear end of which has been welded or otherwise affixed an extension or stud 21' to be inserted into the recess or depression 22' of the knurled wheel 22.

In operation, the carriage is first moved into close proximity to the work to be drilled, the threaded shaft 20 is turned down into the socket 19 about as far as it will go, the stud 21' of drill 21 is inserted into the recess 22' and the drill point directed toward the work. The knurled wheel 22 is then rotated in a direction to feed the drill point into contact with the work and the drilling operation started. As the drilling proceeds the knurled wheel is rotated, applying pressure to the rear of the drill and advancing the drill point as the drilling of the hole proceeds. In case the drill has automatic means for advancing it during a drilling operation it is merely necessary to initially shift the shaft 20 forwardly until the bit 23 encounters the object in which a hole is to be formed, thereby applying the desired pressure to the rear of the drill, and as the hole is deepened the bit will be automatically advanced.

Figure 5:
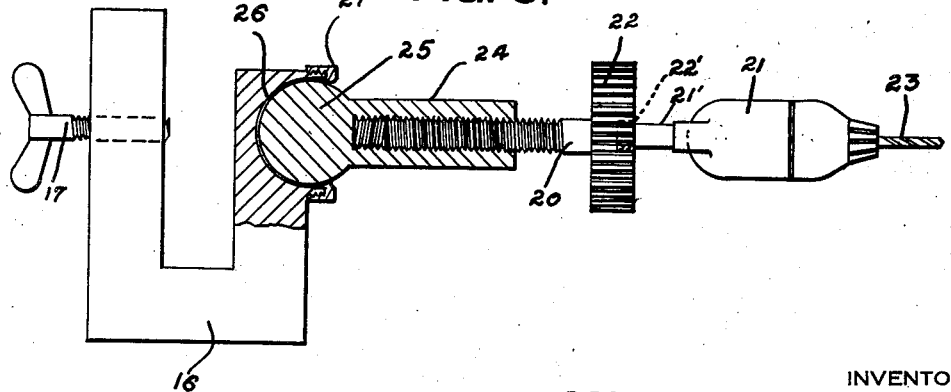
Figure 5 is a view similar to Figure 4 showing a clamp of modified construction.

If so desired the side extension or lug 18 may be omitted and a socket 24 shown in Figure 5 provided to receive the threaded portion of the shaft 20. This socket 24 is formed with a spherical head 25 at its inner end which is held in a corresponding shaped pocket 26 formed in the arm of clamp or bracket 16 by a securing ring 27, and from an inspection of Figure 5 it will be seen that by loosening the ring 27 the socket may be angularly adjusted and the ring again tightened to hold the shaft and the drill at such an angle that a hole may be drilled at a predetermined incline.

While the invention as thus far described is particularly adapted for drilling holes in stationary work in elevated or similar locations where it is difficult to apply manual pressure to the drill point, the support may be used for drilling holes in portable metal plates and the like. In Figure 3 a plate 28 has been shown supported in upright position upon the carriage. The plates must be well supported while being drilled and in order to do so there has been provided a prop or standard 29 which is a duplicate of the standard 10 and is formed at its lower end with a base 30. An opening 31 is formed through the base 30 to register with an opening 32 formed through the platform 2 and through the registering openings is passed a bolt 33 having a head 34 at its lower end and having its upper portion reduced and threaded to form a shank 35 which protrudes from the base 30 and carries a fastener having a threaded hub 36 which is screwed upon the bolt and carries a hand wheel 37 by means of which it is turned and tightened to firmly, but removably, hold the standard or prop upon the carriage. The metal sheet 28 to be drilled rests in an upright position against the prop or standard 29 and by shifting the clamp or bracket 16 from the position shown in Figures 1 and 2 to that of Figure 3 the drill will be presented towards the plate for drilling a hole through the plate. The operation would be the same as heretofore stated except that it would be the standard 10, not the carriage, which is first moved into close proximity to the work to be drilled.

Having thus described the invention, what is claimed is:

In a drill structure, a vertical standard having flat side faces a U-shaped bracket disposed horizontally in straddling relation to said standard with its arms extending across the flat side faces thereof, a set screw passing thru a threaded opening in one arm for engaging the confronting side face of the standard and releasably securing the bracket in a vertically adjusted position upon the standard, the other arm being shorter than the first arm and carrying a lateral extension projecting outwardly from the bracket midway the width of the standard and formed with a longitudinally extending threaded bore leading from its outer end, a shaft extending from the extension longitudinally thereof and being threaded from its inner end and screwed into the bore, a wheel for turning said shaft rigid with the outer end thereof and formed with a recess at the center of its outer face, and a drill extending longitudinally of the shaft and having a longitudinally extending stud projecting from its rear end and engaged in the recess of said wheel to hold the drill in alignment with the shaft.

WILLIAM PILKINGTON.

REFERENCES CITED

The following references are of record in the file of this patent:

UNITED STATES PATENTS

| Number | Name | Date |
|---|---|---|
| 336,487 | Loehner | Feb. 16, 1886 |
| 480,040 | Saylor | Aug. 2, 1892 |
| 530,979 | Williams | Dec. 18, 1894 |
| 926,832 | Germain | July 6, 1909 |
| 1,073,597 | Engelhard | Sept. 23, 1913 |
| 1,150,312 | Stas | Aug. 17, 1915 |